May 26, 1953  M. PIERCE  2,639,878
RECEPTACLE SUPPORT
Filed Aug. 29, 1949
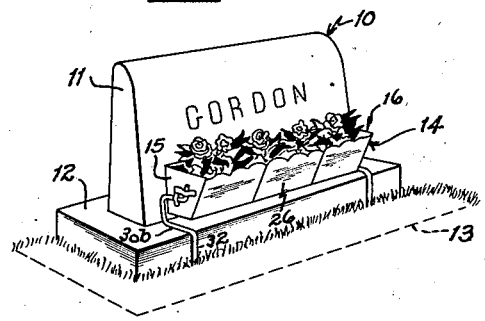
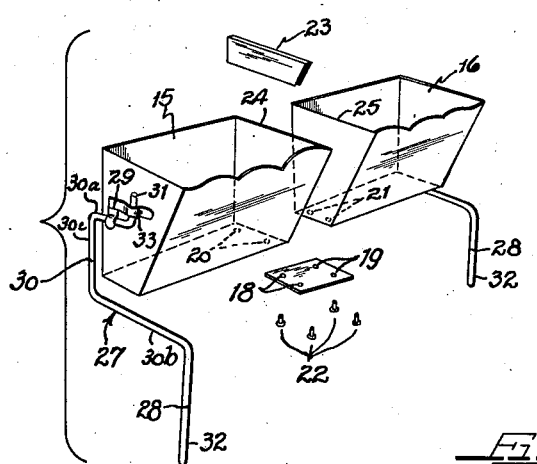
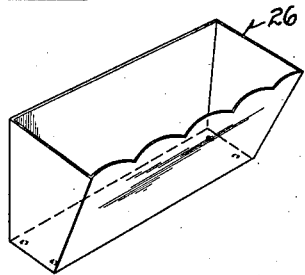
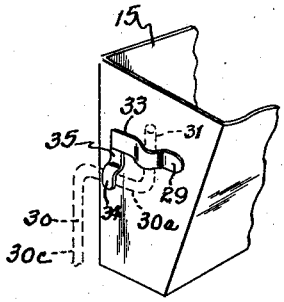
Inventor
MARTIN PIERCE
by Charles H. Redman  Atty.

Patented May 26, 1953

2,639,878

UNITED STATES PATENT OFFICE 2,639,878

RECEPTACLE SUPPORT

Martin Pierce, Aurora, Ill.

Application August 29, 1949, Serial No. 112,950

1 Claim. (Cl. 248—151)

This invention relates to improvements in a vessel for holding flowers or growing plants and particularly to a type which may be adjustably secured on a base or support such as a monument or the like.

It has heretofore been customary either to build a flower or plant holder into the base structure of a monument by means of or as a recess, or to provide a separate vessel to rest on the monument or on adjacent ground. In the former case, the increased cost of construction usually is prohibitive especially if provision is made for the ventilation and watering of flowers and plants. Where separate vessels are employed merely to rest on the monument base, they are easily moved or tipped over, even by the elements. Vessels arranged to rest on the ground often cannot be used because of severe local cemetery restrictions against ground use around the monument.

It is an object of my invention to provide an inexpensive holder for flowers or growing plants which holder may be positioned as desired and held on a base by an anchorage separate therefrom.

Another object is the provision of a sectional holder for flowers or growing plants having means for securing the sections together and for holding them in a desired position on a base or support.

A still further object is to provide a flower or plant holder with means for staking the holder on a supporting base in a desired position.

Still another object of the invention is to provide a flower or plant holder which is simple in design, rugged in construction, economical to manufacture, and highly efficient and easy to use.

Other and further objects of the invention will become apparent to those skilled in the art from the following detailed description of the preferred embodiment of the invention as disclosed in the annexed sheet of drawings, and in which:

Figure 1 is a perspective view of a monument on which is mounted a flower and plant holder embodying principles of this invention;

Figure 2 is an exploded view of a holder of this invention showing details of construction of the means for connecting adjacent ends of the holder sections and of the stakes for anchoring the holder on a support, illustrated herein as a monument base;

Figure 3 is a perspective view of an intermediate section for a holder which section is constructed for insertion between the end sections shown in Figure 2 to effect a holder as shown in Figure 1; and, Figure 4 is an enlarged fragmentary view of an end of a holder section showing, in full lines, a clamp construction and, in dotted lines, a stake construction which is secured to the holder by the clamp.

Shown in Figure 1 is a monument 10 having a head portion 11 and a base 12. Quite frequently, cemetery regulations prohibit the use for planting or displaying flowers of any ground but an extremely narrow strip immediately adjacent to the monument base, such as the strip shown by the dotted line boundaries 13. Inasmuch as such a strip is not always satisfactory, usually because of the limited size, I have provided a flower and plant vessel or holder 14 constructed to rest on and be staked or anchored on a ledge of the monument base.

The holder shown in Figure 2 includes sections 15 and 16 arranged to be connected together at their adjacent ends. A plate 17 has openings 18, 18 and 19, 19 therethrough arranged to register with similar openings 20, 20 and 21, 21 in the bottoms of the holder sections. Screws 22, or other similar fasteners, serve to connect the bottoms of the holder sections together with the latter in end abutment. A U-shaped clip 23 slides over to embrace the upper edges of the end plates 24 and 25 of the holder sections to hold the latter in tight end abutment.

In the event a larger holder is desired, one or more additional sections, such as intermediate section 26 shown in Figure 3, may be added. Abutting ends of adjacent sections are connected together in the same manner as shown in Figure 2. In Figure 1 is shown a three-section holder. This may be increased as desired by adding additional intermediate sections.

The construction so far described provides for a connected sectional holder. When seated on a ledge of the monument base as shown, it is desirable to anchor the holder securely thereon to eliminate shifting or tipping, either of which is unsightly and results in destruction of the flowers or plants contained in the holder. For this purpose, a stake construction 27 is provided at each end of the holder.

Each stake construction includes a stake 28 and an anchoring clip 29. The stake is preferably a metal rod having an intermediate U-shaped section 30 with oppositely extending ends 31 and 32. The top end 31 fits into an open socket recess provided by a U-shaped section in the horizontal leg 33 of the clip. The horizontal portion 30a of the stake, adjacent to the end 31, snaps into a slightly narrower socket space provided by the outwardly offset end 34 of the downwardly extending leg 35 of the clip. In this position, the stake is held firmly against the end of the holder.

The U-shaped section of the stake is so constructed as to position the lower horizontal leg 30b thereof on the ledge of the monument base. Should the stake be shaped so the horizontal leg does not exactly engage the ledge, some vertical adjustment is possible either by bending to shorten the width of the U-shaped section or by slightly raising or lowering the stake within the offset end 34.

To anchor the holder on the monument requires only the driving or forcing of the stake end 32 into the ground immediately adjacent to the monument base. The weight of the holder and flower or plant contents tends to hold them resting on the supporting base. The stake construction eliminates sliding or tipping of the holder.

It is to be noted that the end 31 of the stake is closer than the end 32 to the bottom 30c of the U-shaped section. This permits the holder 14 to be positioned back from the outer edge of the monument base 12. It is apparent that the anchored position of the holder with respect to the edge of the monument base may be changed as desired merely by changing the relative position of the ends 31 and 32 of the stake with respect to each other and to the bottom of the U-shaped section 30.

Although the holder is shown and described in connection with the ledge of a monument, it is to be understood that this is by way of example as the holder may be used with any type of supporting surface.

It will, of course, be understood that various details may be varied through a wide range without departing from the principles of this invention and it is, therefore, not the purpose to limit the patent granted hereon otherwise than necessitated by the scope of the appended claim.

I claim as my invention:

Supporting structure for opposite walls of a vessel, each wall supporting structure comprising an anchoring clip with right angularly extending legs secured to a wall of said vessel, one of said legs having an intermediate U-shaped portion and together with said connected wall of the vessel forming a first socket, the other of said legs having an offset end portion and together with said connected wall forming a second socket, said legs being disposed on said vessel wall with the one leg extending generally horizontal and the other leg extending generally vertically downward, and a rod-like supporting leg member having oppositely extending ends and an intermediate portion bent to form a right angularly extending U-shaped offset, one of said leg member ends being sharpened to form a ground piercing stake, said intermediate U-shaped bent portion of the supporting leg providing spaced horizontal upper and lower legs, the lower of said legs being arranged as a supporting base for the supporting leg member, the upper of said legs being thicker than the space between said vessel wall and the offset end of the anchoring clip defining the second socket whereby said upper leg snaps into and locks within the second socket as the other end of the supporting leg member is inserted home into the first socket.

MARTIN PIERCE.

References Cited in the file of this patent

UNITED STATES PATENTS

| Number | Name | Date |
|---|---|---|
| 236,371 | Somers | Jan. 4, 1881 |
| 360,497 | Whipple | Apr. 5, 1887 |
| 836,555 | Birnie | Nov. 20, 1906 |
| 838,516 | Bodinger | Dec. 18, 1906 |
| 896,384 | Hohnsbeen | Aug. 18, 1908 |
| 1,515,078 | Shee | Nov. 11, 1924 |
| 2,253,172 | Fetterman | Aug. 19, 1941 |
| 2,261,326 | Atkisson et al. | Nov. 4, 1941 |
| 2,399,498 | Messick | Apr. 30, 1946 |
| 2,430,672 | Gandrud | Nov. 11, 1947 |